United States Patent [19]

Petermann et al.

[11] Patent Number: 4,529,313
[45] Date of Patent: Jul. 16, 1985

[54] RING INTERFEROMETER

[75] Inventors: Klaus Petermann; Peter Russer, both of Ulm, Fed. Rep. of Germany

[73] Assignee: Licentia Patent-Verwaltung-GmbH, Fed. Rep. of Germany

[21] Appl. No.: 333,816

[22] Filed: Dec. 23, 1981

[30] Foreign Application Priority Data

Dec. 24, 1980 [DE] Fed. Rep. of Germany ....... 3049033

[51] Int. Cl.$^3$ ..................... G01B 9/02; G01C 19/64
[52] U.S. Cl. ................................................. 356/350
[58] Field of Search ......................................... 356/350

[56] References Cited

U.S. PATENT DOCUMENTS

| 4,259,016 | 3/1981 | Schiffner | 356/350 |
| 4,400,088 | 8/1983 | Schiffner | 356/350 |

FOREIGN PATENT DOCUMENTS

| 2906870 | 9/1980 | Fed. Rep. of Germany . | |
| 2930704 | 2/1981 | Fed. Rep. of Germany . | |
| 2930781 | 2/1981 | Fed. Rep. of Germany . | |
| 2930791 | 2/1981 | Fed. Rep. of Germany . | |
| 2934794 | 3/1981 | Fed. Rep. of Germany . | |
| 2941618 | 4/1981 | Fed. Rep. of Germany . | |
| 3006580 | 8/1981 | Fed. Rep. of Germany | 356/350 |
| 2044447 | 10/1980 | United Kingdom . | |
| 2046434 | 11/1980 | United Kingdom . | |
| 2050598 | 1/1981 | United Kingdom . | |

OTHER PUBLICATIONS

"*Fachlexikon* ABC Physik", 1974, p. 770.
Ulrich, "Representation of Codirectional Coupled Waves", Optics Letters, vol. 1, #3, Sep. 1977, pp. 109–111.
Dyott et al., "Preservation of Polarization in Optical-Fibre Waveguides with Elliptical Cores", Electronic Letters, vol. 15, #15, Jun. 21, 1979, pp. 380–382.
Stoien et al., "Linear Polarization in Single-Mode Fibers", Appl. Phys. Lett., 33(8), Oct. 15, 1978, pp. 699–701.
Amann et al., "Superluminescent Diode as Light Source in Optical Fibre Systems", 148–150.
Post, "Sagnac Effect", Reviews of Modern Physics, vol. 39, No. 2, Apr. 1967, pp. 475–493.
Vali et al., "Fresnel-Fizeau Effect in a Rotating Optical Fiber Ring Interferometer", Applied Optics, vol. 16, #10, Oct. 1977, pp. 2605–2607.
Ulrich et al., "Fiber-Ring Interferometer; Polarization Analysis", Optics Letters, vol. 4, #5, May 1979, pp. 152–154.
Ulrich, "Polarization Stabilization on Single-Mode Fiber", Appl. Phys. Lett., 35(11), Dec. 1, 1979, pp. 840–842.
"Sensitivity Analysis of the Sagnac-Effect Optical-Fiber Ring Interferometer", Lin et al., Applied Optics, Mar. 15, 1979, vol. 18, No. 6, pp. 915–931.

*Primary Examiner*—Vincent P. McGraw
*Attorney, Agent, or Firm*—McGlew and Tuttle

[57] ABSTRACT

A ring interferometer comprises a light source, an optical beam splitting device for receiving light from the light source, a light path encircling an area at least once and opening at both ends into the optical beam splitting device and a photodetector for detecting light from the light path. The light which enters the light path and is coupled to the optical beam splitting device at both ends passes through the light path in both directions. The light then reunites in the beam splitting device and thereby is brought into interference which is detected by the photodetector. The light source is chosen to produce light which has a coherence time which is substantially shorter than the propagation time of light through the light path.

8 Claims, 7 Drawing Figures

RING INTERFEROMETER

FIELD AND BACKGROUND OF THE INVENTION

The present invention relates in general to interferometers and in particular to a new and useful ring interferometer which utilizes a particular arrangement and light source having a coherence time which is substantially shorter than a propagation time in a connected light path of the arrangement.

Ring interferometers, also called optical gyros, and their application for determining absolute, space dependent rotations while utilizing the Sagnac effect, are known (see for example "Review of Modern Physics" 39, No. 2 (1967), pages 475–493, "Sagnac Effect" by E. G. Post).

To measure the rotation rate, a light path is employed which encircles an area once or several times. The light is guided along its path by mirrors and/or light guides. It is particularly advantageous to use optical fibers for establishing the guide path, since then a large number of circular passages of the light can be provided.

Designs of ring interferometers are known from the literature (see for example "Fresnel-Fizeau Effect In A Rotating Optical Fiber Ring Interferometer", by V. Vali, R. W. Shorthill, M. F. Berg; "Applied Optics" 16, No. 10 (1977) pages 2,605–2,607). In prior art designs, disturbances which invalidate the results of measurements, occur in the ring interferometer, which are primarily caused by refractions in a light path (due to the Rayleigh dispersion, for example) and by polarization errors in the fiber. The disturbing effect of refractions is discussed in "Applied Optics" 18, No. 6 (1979), pages 915–931, "Sensitivity Analysis of the Sagnac-Effect Optical-Fiber Ring Interferometer" by S. C. Lin and T. G. Giallorenzi. The injurious effect of polarization errors is described in "Optics Letters" 4 (1979), pages 152–154, "Fiber-Ring Interferometer: Polarization Analysis" by R. Ulrich and M. Johnson. This latter article also deals with the interposition of polarization filters to reduce disturbances caused by polarization errors. To completely eliminate disturbances caused by polarization errors, it is necessary to provide a device for controlling the polarization. Polarization control devices have been described in "Applied Physics Letters" 35, No. 11 (1979) pages 840–842, "Polarization Stabilization On Single-Mode Fiber" by R. Ulrich and in the German patent application No. P 39 34 794.2 ("Method of Measuring Absolute Rotations And Device For Carrying Out The Method).

SUMMARY OF THE INVENTION

The present invention is directed to a ring interferometer of the above mentioned kind which makes it possible to suppress the disturbing effects of reflection and polarization in a simple way.

Accordingly an object of the invention is to provide a ring interferometer which comprises a light source, an optical beam splitting device for receiving light from the light source, a light path encircling an area at least once and opening at both ends into the optical beam splitting device, a photodetector for detecting light from the light path, the light which is emitted by the light source and coupled through the optical beam splitting device to both ends of the light path passing through the light path in both directions and being then reunited in the beam splitting device and thereby brought into interference, and then directed to the photodetector where it is detected, the light source being chosen to produce light having a coherence time which is substantially shorter than a propagation time of the light through the light path.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
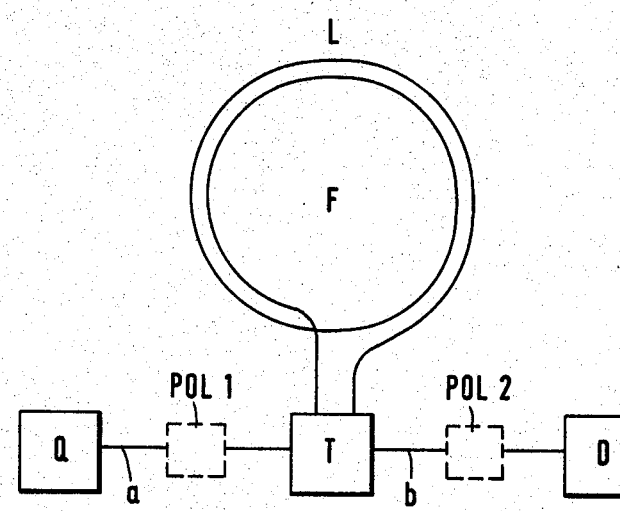
FIG. 1 is a schematic representation of a ring interferometer according to the invention.

Referring to the drawings in particular, the invention embodied therein, comprises a ring interferometer which includes a light source with a coherent time which is substantially shorter than a propagation time of light through a light path connected to the light source through a light splitting device.

FIG. 1 shows a ring interferometer arrangement comprising, in a manner known per se, a source of light Q, an optical beam splitting device T, a light path a connecting light source Q to beam splitting device T, a light path L encircling an area F once or several times and opening at both its ends into beam splitting device T, a photodetector D, and a light path b connecting beam splitting device T to photodetector D. The light emitted from Q is coupled through a and T to the two ends of path L, passes through path L in both directions, to be reunited by T and thus brought to interference, and then guided through b to detector D where it is detected. Beam splitting device T may be a single optical beam splitter or a device including two such splitters. Also, T may be an arrangement with optical single-sideband modulators, such as disclosed in German patent application No. P 29 34 794.2.

Disturbances by reflection are due to the fact that in splitter T, the light fractions reflected in L and T also interfere and lead to measuring errors. To reduce the interferences caused by reflections, the invention provides a light source Q for emitting a light having a small coherence in time. With $\tau_c$ being the coherence time of light source Q, and $\tau_L$ being the propagation time of the light through light path L, the condition:

$$\tau_c \ll \tau_L \tag{1}$$

must be satisfied. Then, only reflected and scattered light portions having propagation time differences between Q and D less than $\tau_c$ can interfere. If the scattering centers are distributed over L about uniformly, the portion of scattered light coming from one end of L can interfere with the scattered light coming from the other end of the fiber only by a fraction equal to $\tau_c/\tau_L$. The scattered light portion capable of interfering and, consequently, the measuring error resulting therefrom, is thus reduced by $\tau_c/\tau_L$. Also, the light reflected in T and transmitted directly from a to b cannot interfere with the light passing through L and thus cannot cause a spurious signal.

In fact, due to their manufacturing process, single mode optical fibers are not exactly cylindrical. Therefore, in a single-mode light waveguide, the two natural waves polarized in mutually perpendicular directions propagate with unequal velocities. In the following, the difference in propagation time of the two natural waves is designated $\tau_L$. Thus, the propagation time through L of the light propagating from L in the first natural wave 1 is $\tau_{L1}$, and the propagation time through L of the wave propagating in natural wave 2 is:

$$\tau_{L2} = \tau_{L1} + \Delta\tau_L \quad (2)$$

with $\Delta\tau_L$ being small relative to $\tau_{L1}$ and $\tau_{L2}$ (typically $\Delta\tau_L/\tau_L \approx 10^{-6} \ldots 10^{-3}$).

A single mode optical fiber having this property is termed birefringent. Since in general, both natural waves are excited in light path L in both directions, in splitter T, a partial beam passing through L in natural wave 1 in one direction may interfere with a partial beam passing through L in natural wave 2 in the opposite direction. Such an interference leads to measuring errors. To avoid such errors in measurement, a development of the invention provides a light source having a coherence time of:

$$\tau_c << \Delta\tau_L \quad (3)$$

The obtained result is that an interference is possible only between light beams propagating in the two directions in the same natural wave. Measuring errors due to an interference between light beams which have propagated in different natural waves are thereby prevented. Since $\Delta\tau_L << \Delta\tau_{L1}$ or $\tau_{L2}$, inequality (3) at the same time satisfies inequality (2). Polarization filters in the optical path and intended to suppress one of the natural waves may therefore be omitted, even though they may be employed to further increase accuracy.

An interposition of polarization filters is advisable if $\tau_c$ is not sufficiently small to obtain a complete depolarization at the end of path L. In such an instance, measuring errors are eliminated by inserting polarization filters in the optical path between source Q and splitter T, or between splitter T and detector D. Arrangements of this kind are provided in German patent application Nos. P 29 06 870, P 29 34 794.2 and P 29 41 618.0.

In FIG. 1, two polarizers POL 1 and POL 2 are indicated in broken lines. The depolarizing effect of a small $\tau_c$ is advantageous in this arrangement too, since interferences due to variations in the rotation of the polarization plane in L are thereby considerably reduced.

Figure 2:
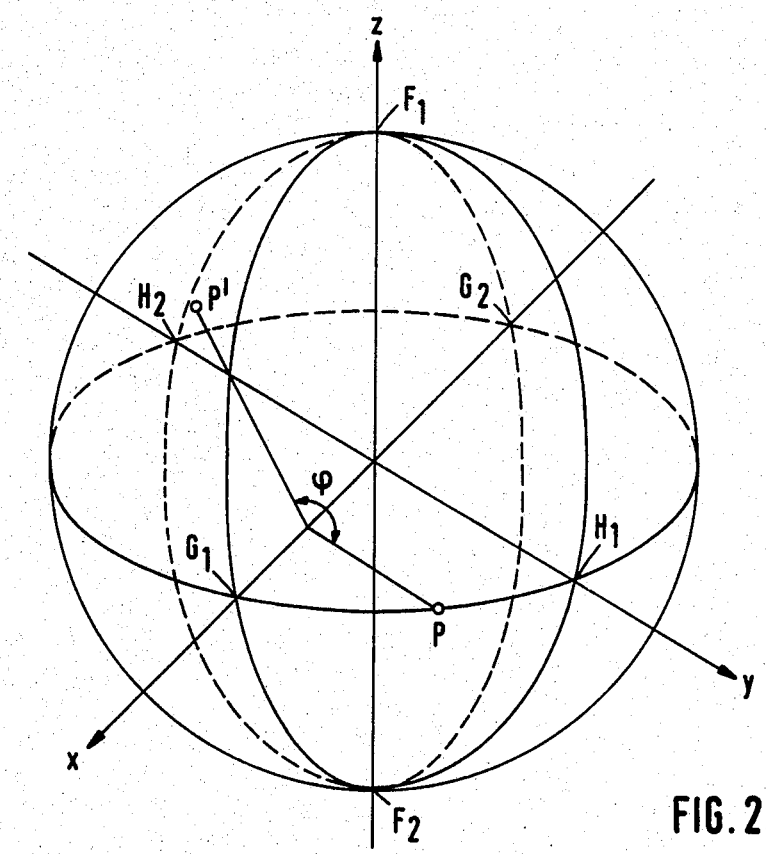
FIG. 2 is an illustration showing the Poincaré used for illustrating the states of polarization of the light in the arrangement of FIG. 1.

The condition established in accordance with inequality (3) results in a complete depolarization of the light having passed through L. This means that there is no correlation between the light propagating in two natural waves through L, and that no interference is possible between the light beams propagating in different natural waves. The mechanism of depolarizing the light passing through L can be illustrated in a simple way by means of a Poincaré sphere as shown in FIG. 2. The representation of polarization states by means of a Poincaré sphere is described, for example, in "Optics Letters" 1, No. 3 (1977) pages 109–111, "Representation of Codirectional Coupled Waves" by R. Ulrich.

In FIG. 2 the following states of polarization are indicated by points on the spherical surface:

| | |
|---|---|
| $G_1$ | Horizontally polarized wave, |
| $G_2$ | Vertically polarized wave, |
| $H_1, H_2$ | Waves polarized at ±45°, o |
| $F_1, F_2$ | Oppositely circularly polarized waves. |

If the single-mode optical fiber used as light path L is linearly birefringent, for example, with the two natural waves being polarized horizontally and vertically, the polarization state represented on the surface of the Poincaré sphere rotates about the x-axis thereof during the propagation of the light through L.

A state P on the Poincaré sphere in FIG. 2 is rotated about the x-axis through an angle $\phi$ into a state P' on the sphere. With a propagation time difference $\Delta\tau_L$ of the two natural waves, the angle is:

$$\phi = 2\pi f_o \Delta\tau_L \quad (4)$$

wherein $f_o$ is the mean frequency of the light emitted by source Q. If the light source Q has a finite coherence time $\tau_c$, the corresponding finite spectral bandwidth is:

$$\Delta f_o = \frac{1}{\tau_c} \quad (5)$$

with equation (5) being valid but for a factor of the order of magnitude 1 depending on the definition. Since the angle of rotation $\phi$ is a function of the light frequency, the rotation of the plane of polarization varies within an angular range $\Delta\phi$ given by the equation:

$$\Delta\phi = \left| \frac{d\phi}{df_o} \right| \Delta f_o = 2\pi \Delta f_o \Delta\tau_L \quad (6)$$

By substituting equation (5) in equation (6), and with unequality (3), it is true that:

$$|\Delta\phi| >> 2\pi \quad (7)$$

which means that for $\tau_c << \Delta\tau_L$, the rotation of the polarization state within spectral range $\Delta f_o$ varies by an amount which is large relative to $2\pi$. Within the polarization state of the light coupled to L lying in the x-y plane of the Poincaré sphere, the light becomes entirely depolarized. In general, the following holds: By rotating the polarization state on the Poincaré sphere about any axis, the angle of rotation within the spectral range of the light varies largely relative to $2\pi$, and if the initial polarization state is on a great circle of the Poincaré sphere, which circle lies in a plane normal to the axis of rotation, the light is completely depolarized.

Therefore, in an advantageous embodiment of the invention, a birefringent single-mode optical fiber is employed as the light path L, and the completely or partly polarized light from Q is coupled to L in a way to obtain the polarization state of light coupled into L on a great circle of the Poincaré sphere, lying in a plane normal to the axis of rotation which is formed by the connecting line between the two natural states of L (i.e. the polarization states of the natural waves of L).

In a specific embodiment, the light path L employed is a linearly birefringent single-mode optical fiber guiding the two horizontally and vertically polarized natural waves, and the light coupled to L is polarized circularly, or linearly at $+45°$ or $-45°$, or elliptically with the major axis at $\pm 45°$.

To obtain a linearly birefringent fiber, a single-mode optical fiber having an elliptic core is advantageously used. Such optical fibers are known and described, for example, in "Electronics Letters" 15, No. 13 (1979), pages 380–382 "Preservation of Polarization In Optical-Fiber Waveguides With Elliptical Cores" by R. B. Dyott, J. R. Cozeus and D. G. Morris. The single-mode optical fiber described in that article has a propagation time difference of $\Delta \tau_L = 5 \times 10^{-4} \tau_{L1}$. With L having a length of about 200 meters, $\tau_{L1} = 10^{-6}$ sec. and $\Delta \tau_L = 5 \times 10^{-10}$ sec. It follows therefrom that in this example, the spectral bandwidth $\Delta f_o$ of source must be large relative to GHz.

Still other suggestions for obtaining linearly birefringent fibers are known, such as from "Applied Phys. Letters", 33 No. 8 (1978) pages 699–701 "Linear Polarization In Birefringent Single-Mode Fibers" by R. H. Stolen, V. Ramasway, P. Kaiser and W. Pleibel, and from German patent application Nos. P 29 30 781.1; P 29 30 791.3; P 29 30 704.8 and P 29 34 794.2.

Another development of the invention provides a circularly birefringent single mode optical fiber as the light path L, with completely or parly linearly polarized light to be coupled thereto.

A circularly birefringent single-mode optical fiber is obtained, for example, in a known manner, by twisting a single mode optical fiber.

Figure 3:
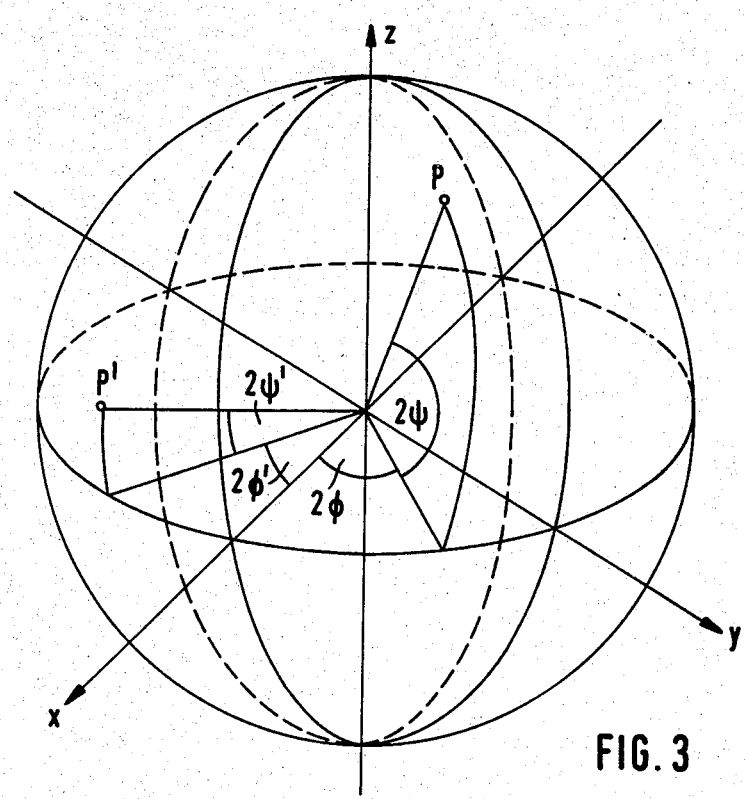
FIG. 3 is a view similar to FIG. 2, showing another embodiment of the polarization.

In another development of the invention, the light path L is composed of one or more parts, each birefringent and each rotating the polarization about another axis of the Poincaré sphere, so that the polarization state in the individual part of light path L is rotated about different axes of the Poincaré sphere. For a certain light frequency, the polarization state P, upon the passage through L, is rotated to a state P', with the coordinate angles $2\phi$, $2\psi$ changing into $2\phi'$ and $2\psi'$ (see FIG. 3). With a finite spectral bandwidth, both $\psi'$ and $\phi'$ depend on the frequency. The birefringence of the individual fiber part produces the effect that for a certain $\Delta f_o$ the light emerging from L is completely depolarized, independently of the polarization state of the light coupled into L. The condition to be satisfied in this regard are:

$$\Delta f_o \left| \frac{d\phi}{df_o} \right| >> \pi \qquad (8a)$$

$$\Delta f_o \left| \frac{d\psi}{df_o} \right| >> \pi \qquad (8b)$$

With a variation of $f_o$ P' (which is a function of $f_o$) is to follow a curve on the Poincaré sphere, extending on the sphere as far as possible symmetrically relative to the origin of coordinates. Therefore, P' following no closed curve on the Poincaré sphere, is a requirement in addition to conditions (8a) and (8b). This may be obtained by choosing widely different magnitudes of $$\left| \frac{d\phi}{df_o} \right| \text{ and } \left| \frac{d\psi}{df_o} \right|$$

The condition of symmetrical extension of the Poincaré sphere may be mathematically expressed by:

$$\int_{-\infty}^{+\infty} I(f_o)\vec{P'}(f_o)df_o = 0 \qquad (9)$$

with $I(f_o)$ being the power spectral density of light source Q and $\vec{P'}(f_o)$ being the vector directed from the origin to point $P'(f_o)$ on the Poincaré sphere. The requirement of covering the origin symmetrically is weaker than that of a uniform covering.

Figure 4:
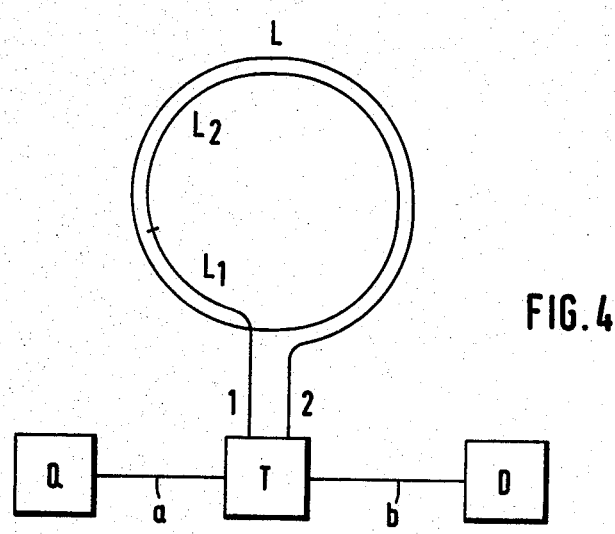
FIG. 4 is a view similar to FIG. 1 showing another embodiment of the inventive arrangement.

FIG. 4 shows diagrammatically, an arrangement of a ring interferometer comprising different parts of light path L. The light path is composed of two parts $L_1$ and $L_2$, one consisting of a linearly birefringent single-mode optical fiber, and the other of a circularly birefringent fiber.

The different values of $$\left| \frac{d\phi}{df_o} \right| \text{ and } \left| \frac{d\psi}{df_o} \right|$$

are obtained by providing unequal lengths of $L_1$ and $L_2$. For example, in practice, one portion of a linearly birefringent single-mode optical fiber is twisted so that in this part, the optical fiber becomes birefringent.

To explain the arrangement of FIG. 4, let us start from the assumption that part $L_1$ is substantially shorter than $L_2$, and that $L_1$ is circularly birefringent, while $L_2$ is linearly birefringent. In part $L_1$, the polarization state rotates about the z-axis of the Poincaré sphere, with $\phi'$ having a function of $f_o$. In part $L_2$, the polarization is rotated about an axis extending in the x-y plane of the Poincaré sphere, with $\psi'$ being a function of $f_o$. Since L is assumed substantially longer than $L_1$, the inequality applies that:

$$\left| \frac{d\psi}{df_o} \right| >> \left| \frac{d\phi}{df_o} \right|. \qquad (10)$$

The polarization P of the light coupled to $L_1$ at 1 changes as a function of $f_o$, to P' at the end 2 of L (FIG. 4).

Figure 5:
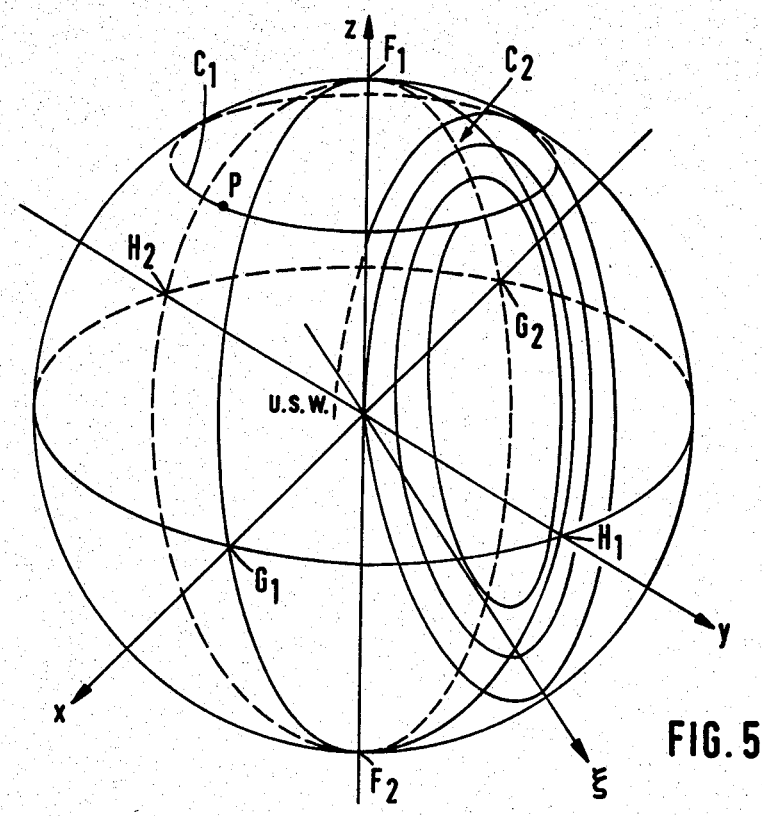
FIG. 5 is a view similar to FIG. 2 showing a still further embodiment of the polarization.
Figure 6:
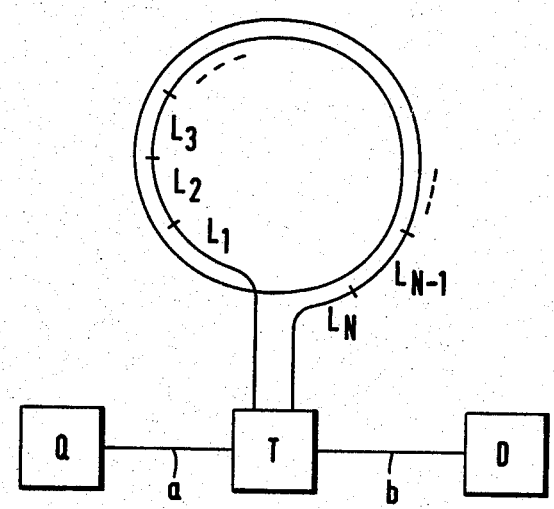
FIG. 6 is a view similar to FIG. 1 of another embodiment of the inventive arrangement.

FIG. 5 shows the curve described by P' on the Poincaré sphere as a function of $f_o$. First, by a rotary motion about z in $L_1$, P changes to polarizations lying on curve $C_1$. Every state of polarization on $C_1$ is then rotated about the axis of rotation $\xi$ of $L_2$. Because of the inequality (10) a great number of rotations about $\xi L_2$ corresponds to a single one about z in $L_1$, the result being the curve $C_2$. FIG. 6 shows another arrangement, with path L being composed of many parts.

The light path L comprises N parts, $L_1$ to $L_N$, each being birefringent and the rotation being effected about different axes of the Poincaré sphere. It is advantageous if in two consecutive parts $L_K$, $L_{K+1}$, with $K = 1 \ldots N-1$, the rotation takes place about axes which are mutually perpendicular. The light path is embodied, in accordance with the invention, for example, as a linearly birefringent fiber comprising a train of parts which are sequentially twisted relative to one another through 45° about their longitudinal axis. The individual parts cause a rotation about polarization axes extending in the x-y plane of the Poincaré sphere, with the twisting through 45° about the longitudinal axes of the fiber at the boundary between every two parts, causing a rotation through 90° of the polarization axis in the x-y plane of the Poincaré sphere. As another embodiment of the arrangement shown in FIG. 6, it is provided to make the light path L of alternately linearly and circularly birefringent consecutive parts. This effects a rotation about a polarization axis extending in the x-y plane of the Poincaré sphere in the linearly birefringent parts, and a rotation about the z-axis of the Poincare sphere in the circularly birefringent parts. The circularly birefringent parts are embodied, for example, by twisting the single-mode optical fiber, so that L is made up of a continuous single-mode optical fiber which is twisted in its every second part.

An advantageous development of the invention provides that the light path L is birefringent along its entire length, however, that the axis of rotation of the plane of polarization of the Poincaré sphere continuously varies over the entire length of L. This variation may be a regular or random function of the fiber length. Such a light path L is produced, for example, by a systematical or irregular turning and/or twisting of a single-mode optical fiber over its entire length.

Since a short coherence time $\tau_c$ is required, semiconductor injection lasers or light sources which are incoherent in time are to be employed as the light source Q. If Q is a semiconductor laser, the needed incoherence is advantageously provided for every individual laser oscillation, which may also be achieved through a modulation. With light sources incoherent in time, a satisfactory coupling factor to light path L can be obtained only if the light emitting area is small. In this regard, the use of so-called superluminescent edge-emitter light emitting diodes is advantageous. Such a light emitting diode is described for example in the German publication "NTG-Fachberichte" Vol. 59 (1977) pages 148–150, "Superluminescent Diode as Light Source in Optical Fiber Systems" by M. G. Amann and W. Harth. With an emission wavelength of 800 nm, the values corresponding to a spectral line width of 10 nm are $f_o = 3.75 \times 10^{14}$ Hz, $\Delta f_o = 4.7 \times 10^{12}$ Hz, and $\tau_c = 2 \times 10^{-13}$ sec, so that the inequalities in (1), (3), (7), (8a), (8b), and (10) can easily be satisfied in all instances, without the necessity of using a strongly birefringent single-mode optical fiber. Because of the smaller $\tau_c$, ring interferometer arrangements adjusted to an interference maximum of the zeroth order are particularly suitable in connection with the method described in the foregoing. Designs of ring interferometers which are adjustable to interference maximums of the zeroth order are disclosed in German patent application Nos. P 29 06 870; P 29 34 794.2 and P 29 41 618.0.

If $\tau_c$ is not sufficiently small to satisfy the conditions of inequalities (1), (3), (7), (8a), (8b) and (10), an insertion of an optical polarizer in both paths a and b or in splitter T, is advantageous (as provided in German application No. P 29 06 870). Another possibility in this case of $\tau_c$ not being sufficiently small, is to employ a non-polarized light source Q or a depolarizer in the light path a.

The inventive ring interferometer discussed in the foregoing requires a device for controlling the direction of polarization which, even though intstrumental in increasing the measuring sensitivity, is expensive.

That is why a further embodiment of the invention is provided by which the ring interferometer is simplified.

Figure 7:
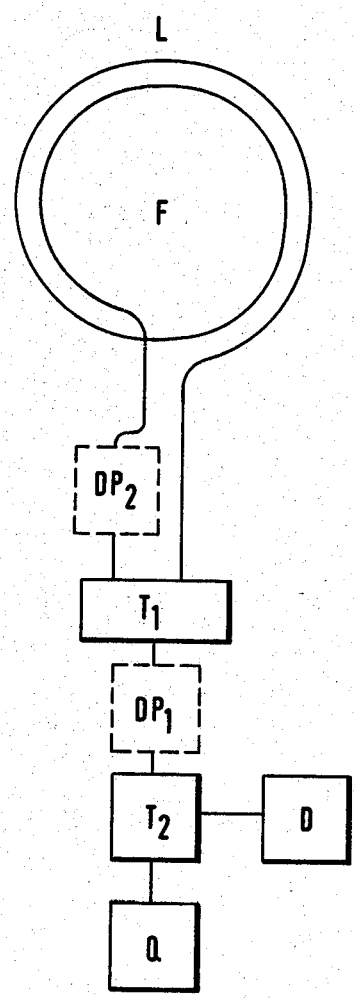
FIG. 7 is a view similar to FIG. 1 a a still further embodiment of the invention.

This embodiment, diagrammatically shown in FIG. 7 has the advantage of rendering the ring interferometer widely insensitive to non-reciprocal phase shifts of the light which are due to disturbances and not to the Sagnac phase shift to be measured.

FIG. 7 shows a ring interferometer of the above-mentioned kind wherein light emitted by a source Q is directed by means of an optical beam splitter $T_1$ and in both directions into a light path L, for example an optic fiber, encircling an area F once or several times. The light issuing from light path L is brought to interference in an optic beam splitter $T_1$, $T_2$ and the resulting light is directed to a photodetector D. From the (electric) output signal of the detector, the Sagnac phase, thus the absolute rate of rotation to be masured can be derived.

To reduce interferences disturbing the rotational rate to be measured, a device for controlling the polarization has been provided in German patent application No. P 29 34 794.2. Since such a device is expensive, the hereinbefore described embodiments of the invention are designed for using, in light path L, depolarized light, which is produced by means of birefringent optical fibers. However, optical fibers exhibiting a definite birefringence needed for this purpose are very costly in manufacture. Therefore, to obtain a depolarizing light path L even with optical fibers exhibiting no definite optical birefringence, the invention provides a depolarizer $DP_2$ which is inserted in light path L and may be built up of discrete optical component parts. With light depolarized in this way, for example, the ring interferometer may be rendered insensitive to non-reciprocal phase shifts of the light which do not originate in the Sagnac phase shift. Non-reciprocal phase shifts, produced, for example, under the Faraday effect by an external magnetic field, depend on the polarization. With depolarized light being directed into light path L, all states of polarization are represented uniformly and, consequently, non-reciprocal phase shifts due to the Faraday effect do not occur. In accordance with the invention, such a depolarized light is produced by inserting another depolarizer $DP_1$ between optical beam splitters $T_1$ and $T_2$.

Advantageously, light path L is formed by a single-wave optical fiber. However, even a single wave fiber guides the second wave of the light with the two orthogonal directions of polarization thereof.

To reliably determine the rotation rate in spite of that, it is advantageous to insert a polarizer (not shown) into the common optical path leading from the light source Q to light path L and from light path L to phase detector D, between beam splitters $T_1$, $T_2$, which then acts in connection with the single-wave optical fiber as a single-wave filter as described in detail in German patent application Nos. P 29 06 870; P 29 34 794.2 and P 29 41 618.0, for example. To still produce depolarized light in light path L the depolarizer is advantageously provided between depolarizer $DP_1$ and beam splitter $T_2$.

With moderately coherent light sources, for example, light emitting diodes, depolarizing arrangements may be obtained by means of birefringent light paths. In such birefringent light paths light propagates in two natural waves which are polarized at right angles to each other and propagate with unequal velocities thorugh the arrangement. While designating $\Delta\tau$ the difference in propagation time between these two natural waves of light, polarizers or depolarizers for these arrangements cna be designed in instances where the propagation time difference $\Delta\tau$ exceeds the coherence time $\tau_c$ of the light emitted by source Q. The coherence time $\tau_c$ is defined in this connection as $\tau_c = 1/(2\pi\Delta f)$, with $\Delta f$ being the spectral bandwidth of the light emitted by the light source, referred to the emission frequency of the source. A depolarizer may be obtained, for example, by uniformly exciting the two natural waves of the birefringent light path, of the light emitted by the light source Q. A birefringent light path excited, for example, with linearly polarized natural waves of the light, produces a depolarizing effect if the incident light is linearly polarized and oriented at a polarization angle of about 45° to the main axes of the birefringent light path, or if the incident light is polarized circularly.

Optical fiber arrangements for depolarizing light paths has been described in the foregoing. Advantageously, depolarizing light paths may also be produced by birefringent crystals. To obtain a depolarized output signal from any polarization of the incoming light, for example, two sequential, linearly birefringent light paths are used having their principal optic axes turned relative to each other through about 45° at the transition points between the light paths.

Multiwave (considered spectrally) semiconductor lasers or superluminescent light emitting diodes have an emission bandwidth of 1 THz to 10 THz, corresponding to a coherence time of 0.015 to 0.15 ps. Presently available depolarizers comprise, for example, two adjacent calcite plates which are turned relative to each other by 45°, with each plate having a thickness of 4 or 2 mm. The two orthogonally polarized natural waves travel therethrough with a propagation time difference of $\Delta\tau$ which is of the order to magnitude of at least 1 ps, so that the depolarizing effect is insured.

Even a light depolarization which is not complete offers considerable advantages over arrangements without any polarizing device. The depolarizers employed in ring interferometers should have a depolarizing effect to at least about 50%—i.e. with any polarizer or analyzer provided after the depolarizer and while varying the plane of polarization, the light efficiency should vary by not more than 50%.

While specific embodiments of the invention have been shown and described in detail to illustrate the application of the principles of the invention, it will be understood that the invention may be embodied otherwise without departing from such principles.

What is claimed is:

1. A ring interferometer comprising a light source, an optical beam splitting device for receiving light from the light source and splitting the light into two beams of light, a light path encircling an area at least once and having ends connected to said beam splitting device with each end receiving one of the two beams of light, and a photodetector connected to the beam splitting device for detecting light coming from the light path and beam splitting device, with the light which is emitted by the light source and coupled through the optical beam splitting device to both ends of the light path passing through the light path in opposite directions, the light being then reunited in the beam splitting device and thereby brought into interference, and then being directed to the photodetector where it is detected, the light source being chosen to produce light having a coherence time $\tau_c$ which is substantially shorter than the propagation time $\tau_L$ of the light through the light path between the opposite ends of the light path, and the coherence time $\tau_c$ of the light source being substantially shorter than the propagation time difference $\tau_L$ of two natural waves of the light path.

2. A ring interferometer according to claim 1, wherein the optical beam splitting device comprises at least two beam splitters and at least one light depolarizing arrangement is provided in at least one of the light path and between the beam splitters.

3. A ring interferometer according to claim 2, wherein a single-wave optical fiber forms the light path.

4. A ring interferometer according to claim 2 wherein a polarizer is provided between at least two beam splitters or between a depolarizer connected between the beam splitters and one of the beam splitters.

5. A ring interferometer according to claim 2, wherein at least one of the depolarizers is embodied by at least one optically birefringent light path.

6. A ring interferometer according to claim 5, wherein at least one of the depolarizers is embodied as an optical train of optically birefringent elements, wherein the propagation time difference of the two natural waves of the light exceeds the coherence time of the light emitted by the light source.

7. A ring interferometer according to claim 2, wherein at least one of the depolarizers comprises at least two optically consecutive light paths which are optically linearly birefringent and have their principal optic axes mutually turned through about 45° at the transit point between the light paths.

8. A ring interferometer comprising a light source, an optical beam splitting device for receiving light from the light source and splitting the light into two beams of light, a light path encircling an area at least once and having ends connected to said beam splitting device with each end receiving one of the two beams of light, and a photodetector connected to the beam splitting device for detecting light coming from the light path and beam splitting device, with the light which is emitted by the light source and coupled through the optical beam splitting device to both ends of the light path passing through the light path in opposite directions, the light being then reunited in the beam splitting device and thereby brought into interference, and then being directed to the photodetector where it is detected, the light source being chosen to produce light having coherence time $\tau_c$ which is substantially shorter than the propagation time $\tau_L$ of the light through the light path between the opposite ends of the light path, a semiconductor injection laser being employed as the light source, the semiconductor injection laser being longitudinally a multiwave laser, and coherence time $\tau_c$ and the spectral bandwidth $\Delta f_o$ of each individual laser oscillation satisfying the conditions that $\tau_c$ is substantially shorter than the propagation time $\tau_L$ and the propagation time difference $\Delta\tau_L$ of two natural waves of the light path, and for orthogonal angles $\phi$ and $\psi$ of the Poincaré sphere $$\left|\frac{\Delta\phi}{\Delta f_o}\right| \Delta f_o \gg \pi \text{ and } \left|\frac{\Delta\psi}{\Delta f_o}\right| \Delta f_o \gg \pi,$$

where $f_o$ is the spectral bandwidth of the light source.

* * * * *

REEXAMINATION CERTIFICATE (2384th)
United States Patent [19]
Petermann et al.

[11] B1 4,529,313
[45] Certificate Issued   Sep. 13, 1994

[54] RING INTERFEROMETER

[75] Inventors: Klaus Petermann; Peter Russer, both of Ulm, Fed. Rep. of Germany

[73] Assignee: Telefunken Systemtechnik GmbH, Ulm, Fed. Rep. of Germany

Reexamination Request:
No. 90/003,257, Nov. 15, 1993

Reexamination Certificate for:
Patent No.: 4,529,313
Issued: Jul. 16, 1985
Appl. No.: 333,816
Filed: Dec. 23, 1981

[30]   Foreign Application Priority Data
Dec. 24, 1980 [DE]  Fed. Rep. of Germany ....... 3049033

[51] Int. Cl.$^5$ .................. G01B 9/02; G01C 19/64
[52] U.S. Cl. .................................................. 356/350
[58] Field of Search ........................................ 356/350

[56]   References Cited
PUBLICATIONS

Schiffner et al, "Reciprocity of Birefringent Single-Mode Fibers for Optical Gyros" Applied Optics, vol. 18, No. 13/Jul. 1, 1979, pp. 2096-2097.

"Fiber-Optic Rotation Sensor Based on the Sagnac-Effect" by G. Schiffner, published by Siemens Aktiengesellschaft (1980).

"Sensitivity Analysis of the Sagnac-effect optical-fiber ring interferometer" by Lin, et al., published by Applied Optics (1979).

*Primary Examiner*—Vincent P. McGraw

[57]   ABSTRACT

A ring interferometer comprises a light source, an optical beam splitting device for receiving light from the light source, a light path encircling an area at least once and opening at both ends into the optical beam splitting device and a photodetector for detecting light from the light path. The light which enters the light path and is coupled to the optical beam splitting device at both ends passes through the light path in both directions. The light then reunites in the beam splitting device and thereby is brought into interference which is detected by the photodetector. The light source is chosen to produce light which has a coherence time which is substantially shorter than the propagation time of light through the light path.

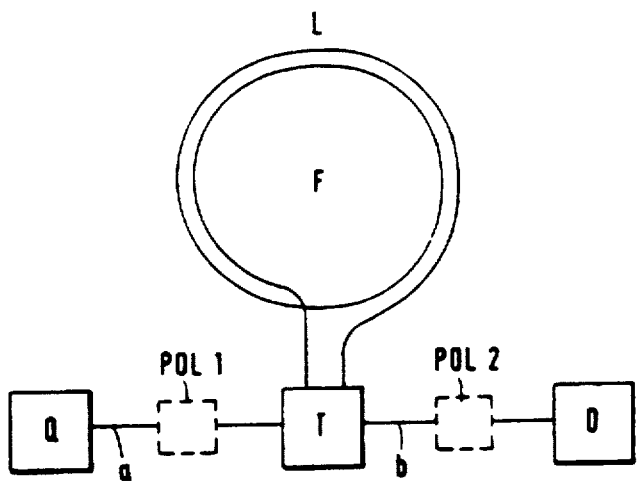

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-8 is confirmed.

* * * * *